United States Patent

[11] 3,536,115

| [72] | Inventor | Anthony J. Weiler<br>Palmyra, Wisconsin |
|---|---|---|
| [21] | Appl. No. | 696,945 |
| [22] | Filed | Jan. 10, 1968 |
| [45] | Patented | Oct. 27, 1970 |
| [73] | Assignee | Weiler and Company<br>Whitewater, Wisconsin<br>a corporation of Wisconsin |

[54] FOOD GRINDER
2 Claims, 3 Drawing Figs.

[52] U.S. Cl. .................................................. 146/189
[51] Int. Cl. .................................................. B02c 18/18,
A47j 43/04
[50] Field of Search ........................................ 146/189,
188, 185, 187, 182, 184

[56] References Cited
UNITED STATES PATENTS
19,421  2/1858  Helton..................... 146/182

| 507,195 | 10/1893 | Woodru..................... | 146/185 |
| 1,021,000 | 3/1912 | Mitchell..................... | 146/189 |
| 1,694,502 | 12/1928 | Dryden..................... | 146/189 |
| 1,946,001 | 2/1934 | Schaul..................... | 146/182 |
| 3,119,427 | 1/1964 | Kumzi et al..................... | 146/182 |

*Primary Examiner*—Andrew R. Juhasz
*Assistant Examiner*—Z.R. Bilinsky
*Attorney*—Wheeler, Wheeler, House and Clemency ABSTRACT: Disclosed herein is a heavy duty grinder having a screw type conveyor to convey a food product toward an adjustable perforate plate with an additional pressure flight on the shaft of the conveyor adjacent the plate and one or more breaker cams on the shaft of the conveyor. A knife assembly is positioned in the end of the shaft of the conveyor with the cutting edges of the knife independently biased into engagement with the surface of the plate. The knife is provided with an axially projecting shaft extending through the hub of the perforated plate and surrounded externally by a spring confined by a nut and washer at the end of the shaft.

Patented Oct. 27, 1970
3,536,115
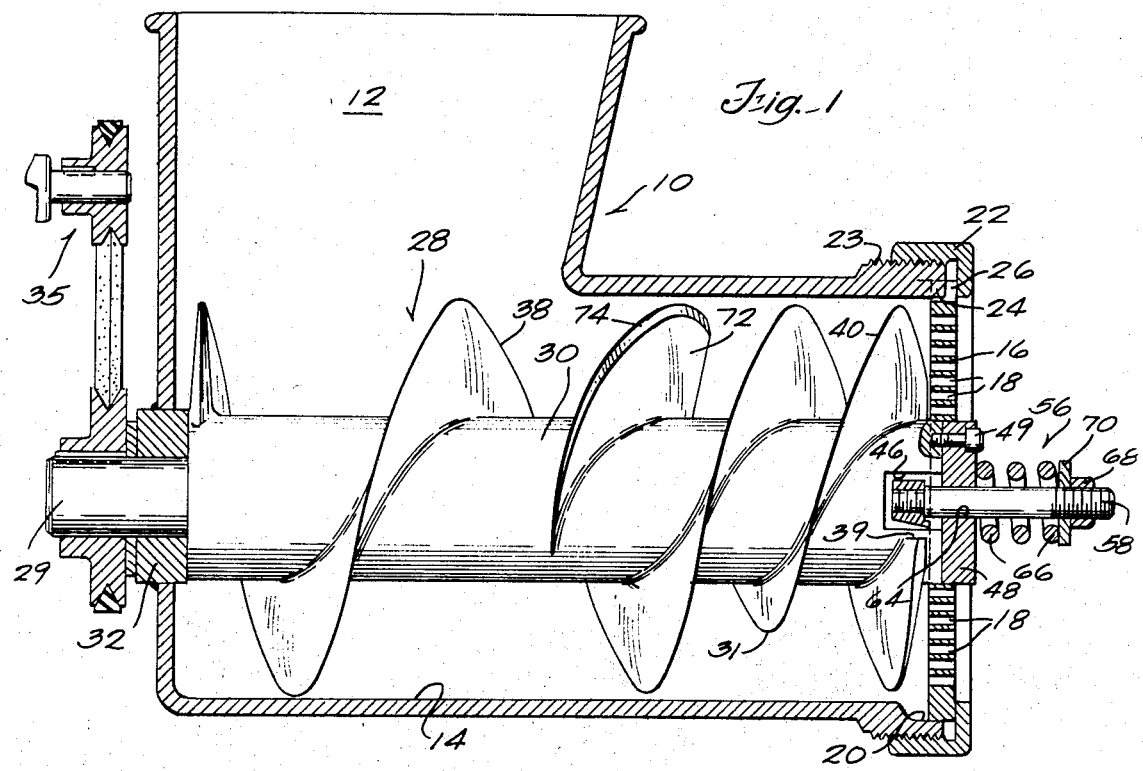
Fig. 1
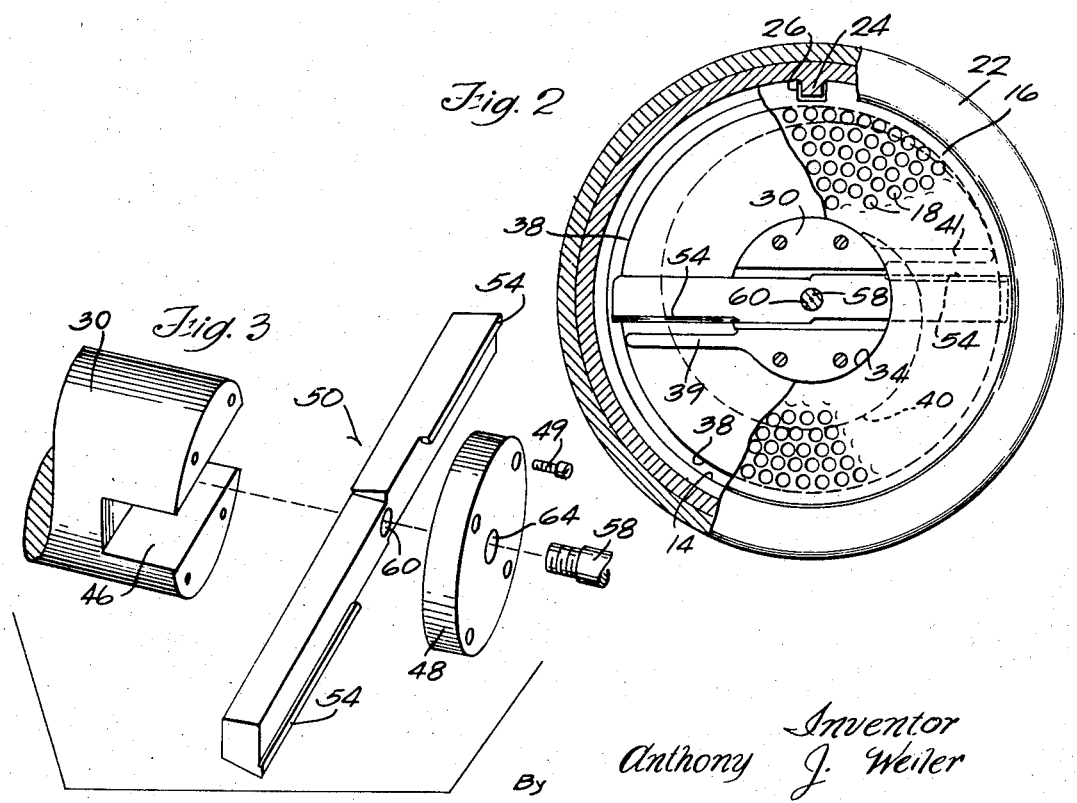
Fig. 2
Fig. 3
Inventor
Anthony J. Weiler
By Wheeler, Wheeler, House & Clemency
Attorneys

FOOD GRINDER

BACKGROUND OF THE INVENTION

Heavy duty grinders for processing food material containing items such as bones, hooves, horns and teeth are used in preparing animal foods. These grinders generally have an auger type conveyor with a spring biased knife mounted in the end of the shaft of the conveyor in a position to engage a perforated plate mounted in the cutter of the grinder. The perforate plate is adjustable with respect to the end of the shaft of the conveyor to provide a gap of predetermined size between the trailing edge of the pressure flights and the face of the perforate plate. As food is forced through the grinder, some of it becomes lodged in the gap or space between the end of the shaft of the conveyor and the face of the plate. As the accumulation of the food product builds up, the perforate plate will bow outward reducing the effectiveness of the grinder.

The knife is located within the grinder and cannot be adjusted unless the grinder is disassembled which means that the grinder must be completely disassembled each time the bias on the knife has to be changed. When processing a product that contains abrasive material such as bones and teeth, wear of the plate is rapid often requiring adjustment two or three times a day.

SUMMARY OF THE PRESENT INVENTION

The present invention relates to a heavy duty grinder which has an auger type conveyor having pressure flights to squeeze an animal food material against an adjustably mounted perforate plate. Additional pressure flights are provided on the conveyor near the perforate plate to increase the rate of flow and pressure of the material against the plate. One or more breaker cams may also be mounted on the shaft of the conveyor to break up any large solid material such as bones in the food material being processed. A knife having radial cutting edges is mounted in the end of the shaft of the conveyor with the cutting edges positioned to closely follow the trailing edges of the pressure flights of the conveyor to streamline the flow of material through the perforate plate. The knife is independently biased into engagement with the surface of the perforate plate by an external spring assembly to allow for positive adjustment of the bias anytime to compensate for wear or adjustment of the perforate plate without disassembling the grinder.

The perforate plate is mounted in an external adjusting ring having threads concentric with the auger axis. The auger shaft, or an extension, passes through a concentric center bearing hole in the perforate plate assuring concentricity of the shaft and almost eliminating any dead space for animal food material to occupy. Such dead space as remains is not so located that material jammed therein can warp the perforate plate, because the shaft, not the plate, occupies the unperforated area.

Exterior adjustment of the axial position of the perforate plate is also provided by this arrangement.

Other objects and advantages will become apparent from the following detailed description when read in connection with the accompanying drawings in which:

FIG. 1 is a side view in section showing the grinder;
FIG. 2 is a front view of the grinder; and
FIG. 3 is an exploded view of the end of the auger.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2 of the drawing, the heavy duty grinder of this invention includes a housing 10 having a hopper 12 and a fluted throat 14. A plate 16 having a plurality of perforations 18 is positioned within an enlarged opening 20 at the end of the throat 14 and is held in position by an adjustment ring 22 screwed onto threads 23 on the housing. A lug 24 matingly engages a groove 26 in the plate to prevent rotation of the plate in the opening 20.

An auger or screw type conveyor 28 is mounted in the throat of the housing with a drive shaft 29 on one end of the conveyor shaft 30 extending through a radial thrust bearing 32. The conveyor is driven by a motor and belt arrangement 35 shown schematically on the outside of the hopper. The other end of the conveyor shaft extends through and rides on an opening 34 in the center of plate 16.

The food material is moved by a continuous pressure flight 38 on the shaft 30 with the pitch of the pressure flight 38 decreasing from left to right (FIG. 1) to produce a crushing action on the material and forcing the material into the perforations 18 in the plate 16. A second pressure flight 40 is provided near the end of the shaft 30 and has an outer edge 31 that gradually increases in diameter until it is equal to the diameter of the continuous flight 38 near the plate 16. It should be noted in FIGS. 1 and 2 that the trailing edges 39 and 41 of the two pressure flights 38 and 40 terminate in radially directed lines in close proximity to the surface of the plate 16. The trailing edges squeeze the food material against the plate 16 and force it into perforations 18 in the plate 16. The distance between the edges 39 and 41 of the pressure flights and the surface of the perforate plate is critical to the proper operation of the grinder since it must be varied to process different types of food material. This distance is adjusted by merely tightening or loosening the adjusting ring 22 on threads 23 to move the plate toward or away from the pressure flights.

The surface of the perforate plate must be scraped continuously to assure an even flow of material through the plate. To accomplish this wiping or scraping action a knife 50 is placed in a slot 46 in the end of the shaft 30 with the radial cutting edges 54 of the knife positioned to follow the trailing edges 39 and 41 of the flights 38 and 40. An end cap 48 is secured by bolts 49 to the end of the shaft 30 to hold the knife in position in slot 46. The cutting edges 54 of the knife are biased into engagement with the surface of the perforate plate 16 by means of an external spring assembly 56 which can be adjusted externally of the grinder and independently of the position of the plate 16. The spring assembly includes a bolt 58 screwed into a threaded aperture 60 in the center of the knife and extending axially outward through an aperture 64 in the end cap 48. A spring 66 is retained on the bolt 58 by a nut 68 and washer 70. Adjustment of the spring force is accomplished by merely turning the nut 68. An eye bolt can also be used to support the knife in the end of the shaft in place of the bolt 58.

The end of the shaft 30 and end cap 48 extend into the opening 34 in the center of the plate 16 as seen in FIG. 1. The outer diameter of the shaft 30 and end cap 48 is substantially the same as the diameter of the opening 34 in the plate 16 so that they ride on the inner surface of opening 34. Although no seal is provided between these surfaces, only a small amount, if any, of the food material will flow through the space. This is due to the rearwardly directed angle of the flights 38 and 40 adjacent the plate 16 which forces the food material radially outwardly from the shaft 30 and away from the gap between the surface of the shaft 30 and the opening 34.

If the grinder is to be used to grind material having a large amount of tough items, such as hooves, horns, bones, etc., one or more breaker cams 72 may be provided on the shaft 30. These cams are located between the flights of the pressure flights 38 and are of smaller diameter. The edge 74 of the breaker cam should be tapered to provide a breaking action when a bone or the like is lodged in the space between the cam and the throat of the hopper.

When the grinder is operated, the plate 16 is set for the particular product that is being ground. This can very according to the amount and size of the tough or solid items, such as bones, hooves, horns, etc., being fed to the grinder. Breaker cams 72 should be used where a high volume of tough items are anticipated. After the plate 16 has been set, the bias on the knife is set by turning nut 68. The radial cutting edges of the knife which are biased against the inner surface of the plate will hold the plate against the adjustment ring. The spring force can be adjusted by setting the nut 68. This force also varies with the type of material being ground. After the food material is forced against the perforated plate 16, the cutting edges of the knife will follow trailing edges 39 and 41 of the pressure flights to provide a streamlined flow of material through the perforations in the plate of the grinder.

I claim:

1. A heavy duty grinder comprising a housing for an auger having inlet and outlet openings, a perforate plate adjustably mounted in said outlet opening in said housing, an auger mounted in said housing to squeeze a food product against said plate, a knife mounted in the auger and having radially directed cutting edges positioned to slide over the surface of said plate, and spring means to bias the knife toward the surface of the perforate plate, said auger including a continuous pressure flight of decreasing pitch and an additonal pressure flight near the perforate plate, the trailing edges of each pressure flight being located in close proximity to the cutting edges of said knife, said knife being retained in the auger by an end cap and said spring means including a bolt secured to said knife and extending through said plate, a spring mounted on said bolt and an adjustment nut on said bolt to vary the bias of said opening.

2. A heavy duty grinder comprising a housing having a hopper and a throat, a perforate plate adjustably mounted in the end of said throat and having a central aperture, an auger type conveyor mounted in said throat, said auger type conveyor having one end journaled in the aperture in said plate, said conveyor including a continuous pressure flight and an additional pressure flight near the end of said conveyor, a radial knife mounted in the end of said conveyor in a position to ride on the inside surface of said plate and an externally adjustable spring means to bias the knife against the plate, said conveyor including a radial slot and an end cap, said knife being positioned in said slot, and said spring means including a bolt extending through the end cap, a spring mounted on the bolt and an adjustment nut on the end of the bolt.